(12) United States Patent
Heinemann

(10) Patent No.: US 9,080,654 B2
(45) Date of Patent: Jul. 14, 2015

(54) ACTUATOR DEVICE FOR ADJUSTING A SLIDING CAM SYSTEM

(75) Inventor: Robert Heinemann, Fuerth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/877,574

(22) PCT Filed: Aug. 22, 2011

(86) PCT No.: PCT/EP2011/064329
§ 371 (c)(1),
(2), (4) Date: Apr. 3, 2013

(87) PCT Pub. No.: WO2012/045515
PCT Pub. Date: Apr. 12, 2012

(65) Prior Publication Data
US 2013/0199330 A1    Aug. 8, 2013

(30) Foreign Application Priority Data

Oct. 8, 2010    (DE) .......................... 10 2010 048 005

(51) Int. Cl.
| F01L 1/18 | (2006.01) |
| F16H 25/18 | (2006.01) |
| F01L 1/053 | (2006.01) |
| F01L 13/00 | (2006.01) |

(52) U.S. Cl.
CPC ................ F16H 25/18 (2013.01); F01L 1/053 (2013.01); F01L 13/0036 (2013.01); *Y10T 74/2101* (2015.01)

(58) Field of Classification Search
CPC ...... F01L 1/053; F01L 13/0036; F16H 25/18; Y10T 74/2101
USPC ........................ 123/90.44, 90.48, 90.18, 90.6
See application file for complete search history.

(56) References Cited

U.S. PATENT DOCUMENTS

| 6,967,550 B2 | 11/2005 | Elendt et al. |
| 8,186,318 B2 | 5/2012 | Sunada et al. |
| 8,225,759 B2 | 7/2012 | Wutzler et al. |
| 8,339,225 B2 | 12/2012 | Nendel |
| 2009/0159030 A1 | 6/2009 | Bugescu et al. |
| 2010/0237264 A1 | 9/2010 | Lengfeld et al. |

FOREIGN PATENT DOCUMENTS

| DE | 20114466 U1 | 1/2002 |
| DE | 10240774 A1 | 4/2003 |
| DE | 102007052253 A1 | 5/2009 |
| DE | 102008020892 A1 | 10/2009 |
| DE | 202009015466 U1 | 3/2010 |
| EP | 2196638 A1 | 6/2010 |
| WO | WO 2010103637 A1 | 9/2010 |

*Primary Examiner* — Ching Chang
(74) *Attorney, Agent, or Firm* — Davidson, Davidson & Kappel, LLC

(57) ABSTRACT

An actuator device of a sliding cam system having at least one sliding cam and at least one engaging pin (2) projecting out from a housing (1), the housing (1) being fastenable to a component of a cylinder head or to the cylinder head of an internal combustion engine, and the engaging pin (2) being able to be contacted by at least one groove of the sliding cam system that has at least one lead-out slope, and the engaging pin (2) being spring-loaded toward the sliding cam, and, in the retracted position thereof facing the groove, the engaging pin(s) (2) or at least one component connected thereto can be secured in place by an arrestable latch device.

15 Claims, 9 Drawing Sheets

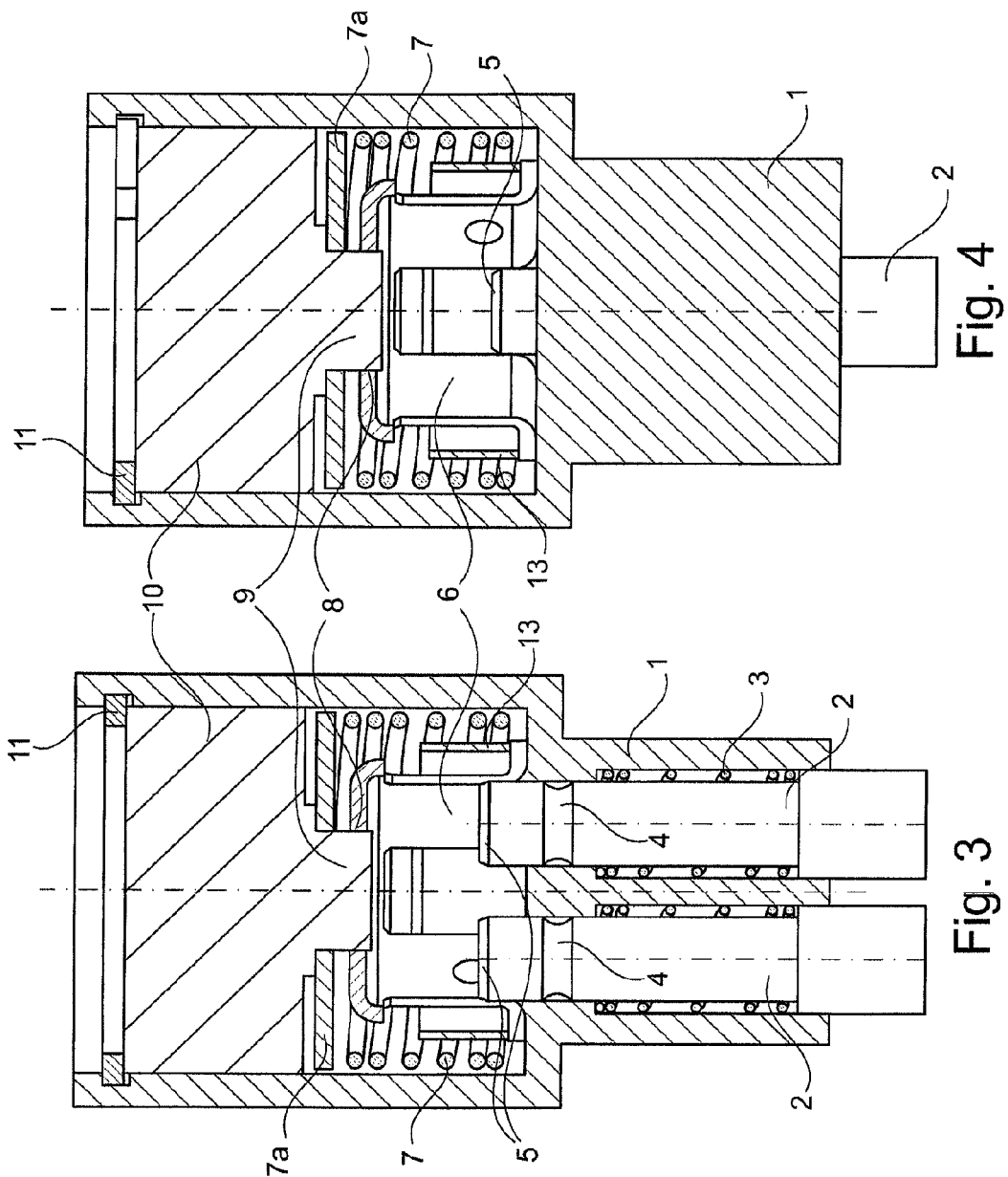

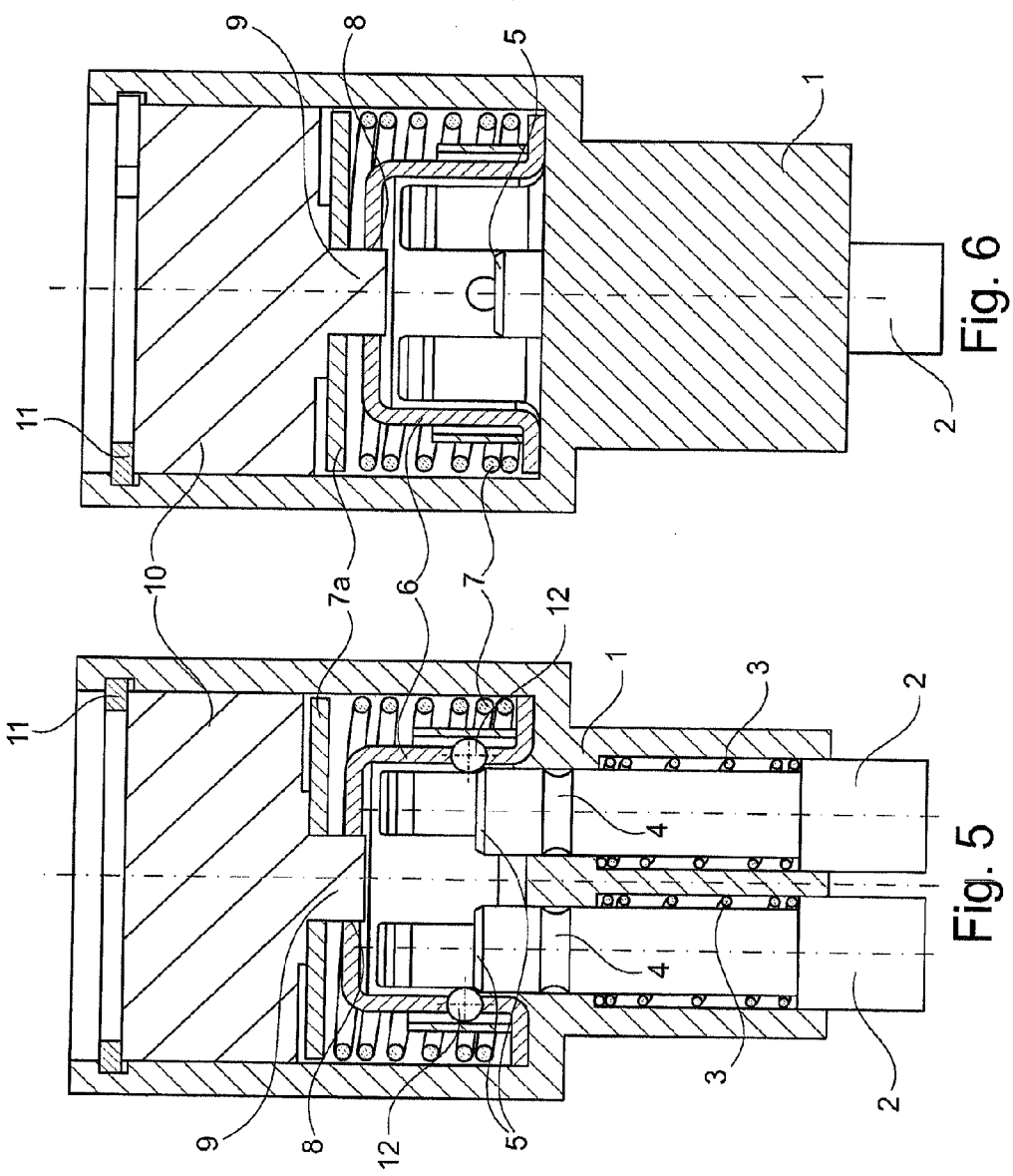

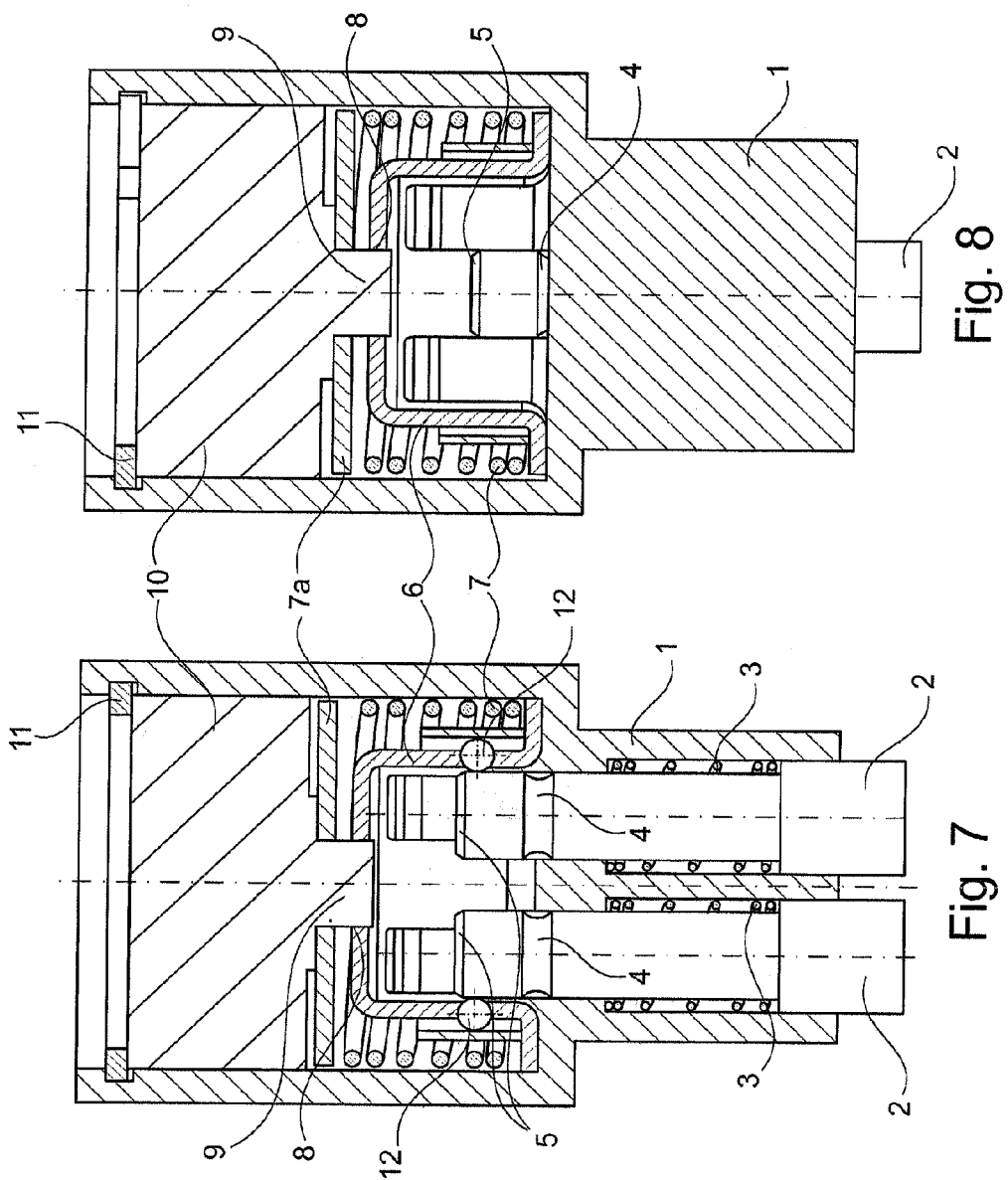

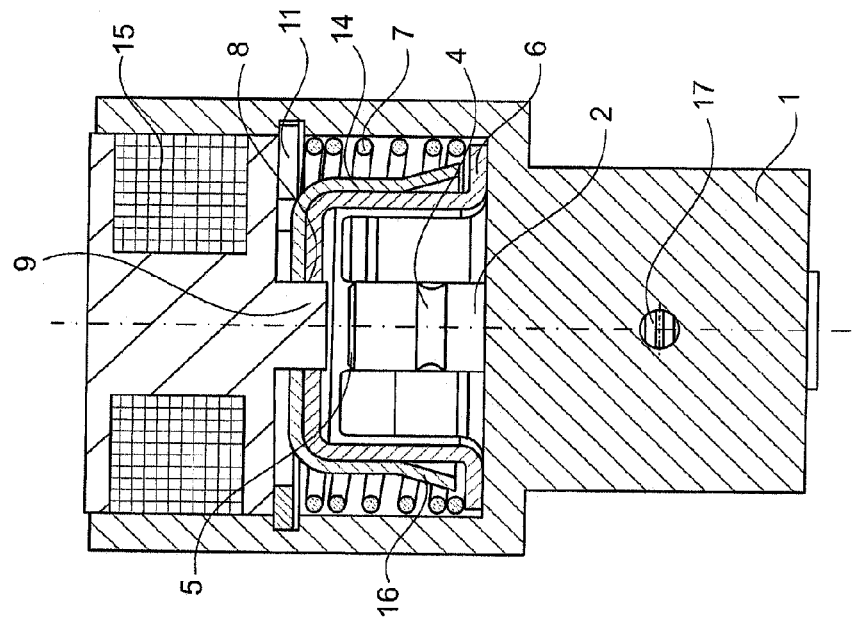
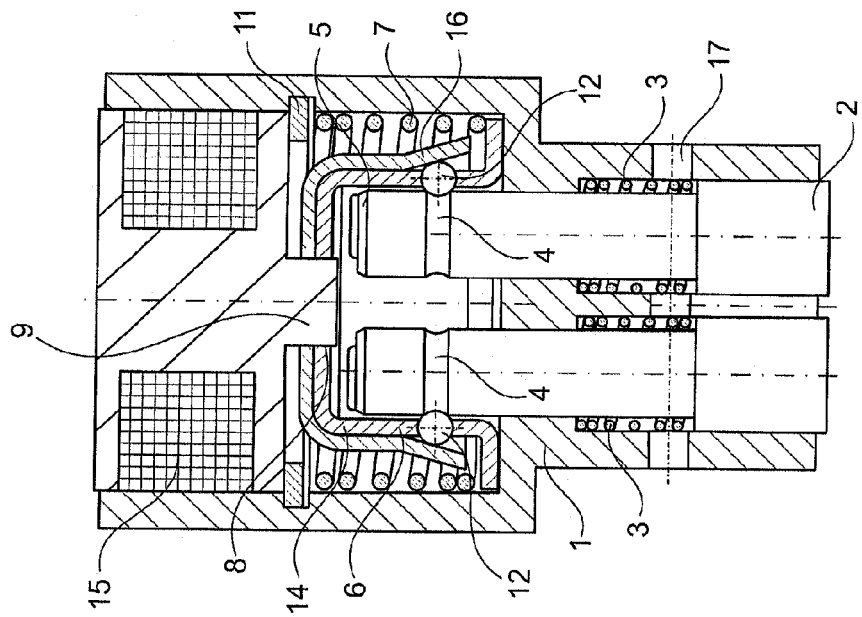
Fig. 10
Fig. 9

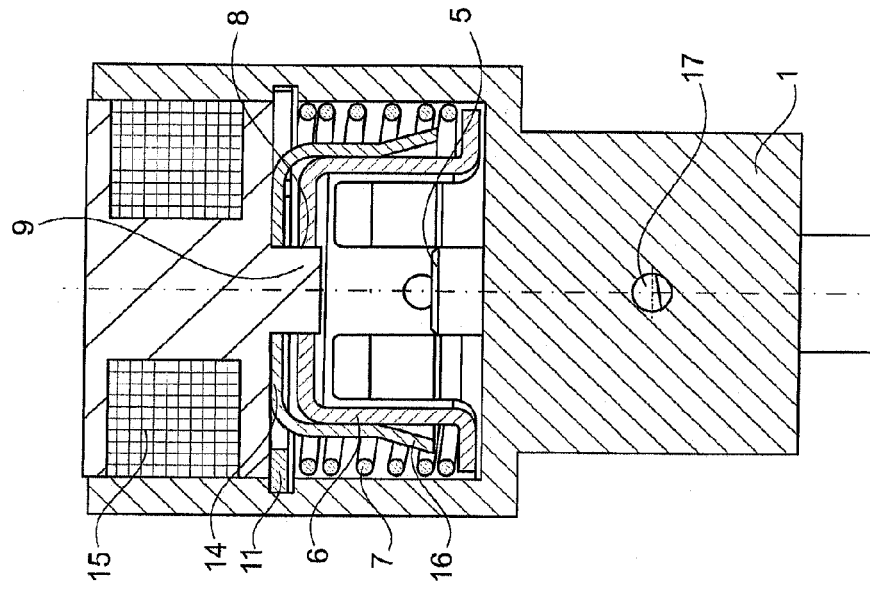
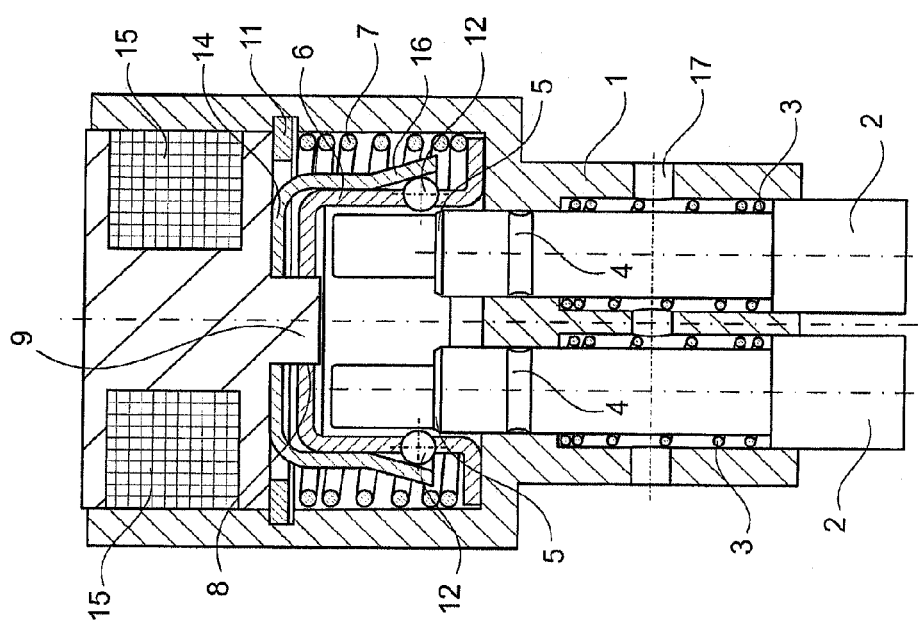

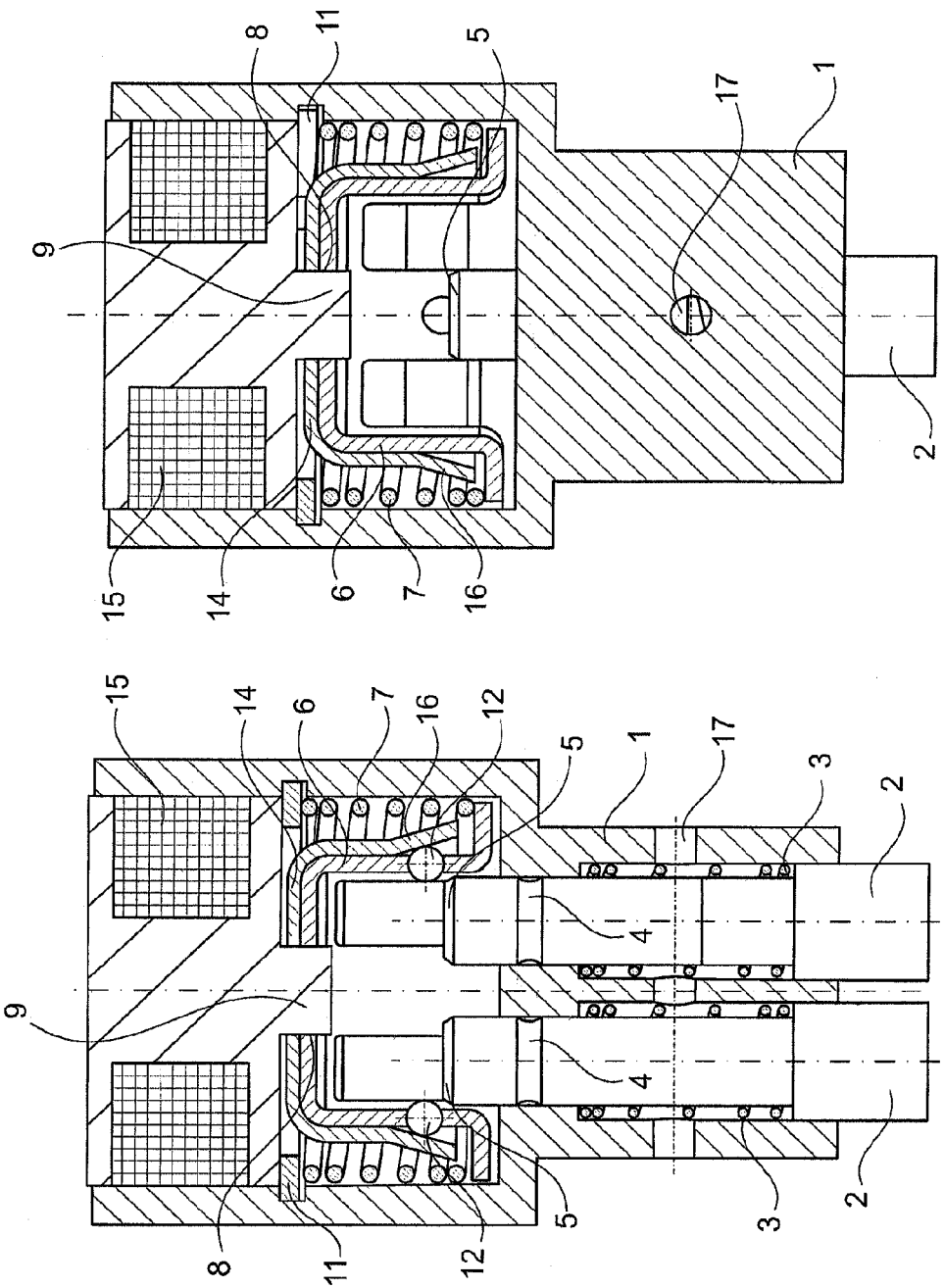

ACTUATOR DEVICE FOR ADJUSTING A SLIDING CAM SYSTEM

An actuator device of a sliding cam system having at least one sliding cam and at least one engaging pin projecting out from a housing, the housing being fastenable to a component of a cylinder head or to the cylinder head of an internal combustion engine, and the engaging pin being able to be contacted by at least one groove of the sliding cam system that has at least one lead-out slope, and the engaging pin being spring-loaded toward the sliding cam.

BACKGROUND

An actuator device of the type described is known from the German Patent Application 102 40 774 A1. Starting out from the retracted inner position of the engaging pin, the engaging pin is activated in response to energization of a coil, thereby producing a magnetic field that is oriented oppositely to the field of a permanent magnet, displacing the same. The displacement of the field reduces the holding force between the permanent magnet and the coil core, so that the magnetic field produced by the coil and the force of a spring acting on the engaging pin allow the engaging pin to travel out, so that it engages in the groove of the sliding cam system and effects a desired displacement of the sliding cam. The return travel of the engaging pin into the inner position thereof is initiated by the lead-out slope that moves the engaging pin away from the sliding cam counter to the force of the spring by such a distance and at such an acceleration that the engaging pin is held securely by the permanent magnet and the magnetic field thereof at the coil core, given a cut-off energization of the coil. In the case of the actuator device of the species, it has been found to be disadvantageous that a permanent magnet is required that is temperature-sensitive and has only a short service life. In addition, considerable energy is needed to initiate the traveling out of the engaging pin. Also, there is a certain time delay inherent to building up the magnetic field.

SUMMARY OF THE INVENTION

It is an object of the present invention to provide an actuator device having the features described at the outset in a way that will overcome the described disadvantages and require only few components, thereby reducing the outlay for assembly and the associated costs. Moreover, it is intended that the control also be rapidly effective.

The present invention provides that the engaging pin(s) or at least one component connected thereto, in the retracted position thereof facing the groove, be able to be secured in place by an arrestable latch device.

Thus, if the arresting of the latch device is released, the engaging pin(s) is/are able to travel out without delay due to the spring loading thereof. For that reason, the arrestable latch device does not participate directly in the movement of the engaging pin(s), so that less constructional outlay and forces are required than in the case of the device of the species.

The latch device advantageously has at least one detent element that is operatively connected to at least one detent groove on the engaging pin or the component. The detent element, which is preferably in the form of a ball, is movably guided in a shift gate radially to the engaging pin and fixed transversely thereto. The detent groove is adapted to the detent element head or the ball and surrounds the same only to the point where a transverse movement between the detent groove and the detent element head or the ball releases the latching. Thus, as soon as the detent element or the ball emerges from the detent groove because it is no longer held therein, the engaging pin is briefly released and may then contact the groove of the sliding cam system. It is significant how quickly the engaging pin emerges from the housing since the sliding cam system is located on a rotating shaft which rotates at half of the speed of the crankshaft speed of the internal combustion engine.

The guidance of the detent element or ball is advantageously implemented as a bore in the shift gate, the bore tapering toward the detent groove to a dimension smaller than the dimension, respectively the diameter of the detent element or ball. This ensures that the detent element or ball is not able to emerge inwardly from the bore when the detent element or ball is not able to be supported by the engaging pin.

The shift gate advantageously has a yoke- or pot-like design and is loaded in the direction of the engaging pin by a compression spring that is braced against the housing directly or via the interposition of a component, and leads through a central opening to a pin-like projection. The central opening is connected to the pin-like projection in a torsionally fixed, but displaceable manner. The pin-like projection, in turn, is part of a rotary motor that is fixedly supported on the housing. This enables the rotary motor to impart a rotary motion via the pin-like projection and the central opening to the shift gate, whereby the detent element(s) or the ball(s) move out of the detent groove, releasing the engaging pins. The diameter of the engaging pins and, thus, the diameter of the detent grooves are considerably smaller than the radius of the location where the detent elements or balls are positioned on the shift gate, so that the engaging pins are released in response to a small rotation of the shift gate.

The detent element(s) or the ball(s) are preloaded in the direction of the detent groove by a spring steel sheet, so that they engage in the detent groove as soon as they reach the same. The force of the spring steel sheet suffices to hold the detent element or ball in the detent groove and to arrest the engaging pin.

Another embodiment of the present invention provides that the shift gate be surrounded by an actuator pot that is of the magnetic type, is axially movably supported on the pin-like projection, and has a peripheral region having a conical inner surface, against which at least one detent element is braced. Adjoining the pin-like projection is an electromagnetic unit, which is installed in the housing so as to be at least axially fixed thereto and via which the actuator pot is displaceable.

Therefore, in this exemplary embodiment, the detent element(s) or ball(s) are released in response to the shifting of the actuator pot by the electromagnet, the conical inner surface of the actuator pot radially releasing the detent elements. It is significant that the detent groove surrounds the detent element head, respectively the ball only to the point where the detent element(s) and the ball(s) are able to be radially shifted by the edge of the detent groove.

BRIEF DESCRIPTION OF THE DRAWINGS

For further clarification of the present invention, reference is made to the drawings which illustrate two exemplary embodiments of the present invention in a simplified form.

In the drawing,

FIGS. 3 and 4 show cross sections in accordance with FIGS. 1 and 2, where the engaging pins are disengaged and extended out;

FIGS. 5 and 6 show cross sections in accordance with FIGS. 1 and 2, where the arrestable latch device is turned back to the arresting position, including extended engaging pins; and FIGS. 7 and 8 show cross sections in accordance with FIGS. 1 and 2 during the return movement of the engaging pins through the lead-out slope(s) into the arresting position.

FIGS. 9 and 10 show cross sections through an actuator device similar to FIGS. 1 and 2 having a different type of arrestable latch device;

FIGS. 13 and 14 show cross sections in accordance with FIGS. 9 and 10, where the engaging pins are extended out; and FIGS. 15 and 16 show cross sections in accordance with FIGS. 9 and 10, where the engaging pins are located in a position at the beginning of the lead-out slope and at the start of the return movement into the arresting position.

DETAILED DESCRIPTION OF THE DRAWINGS

Figure 17:
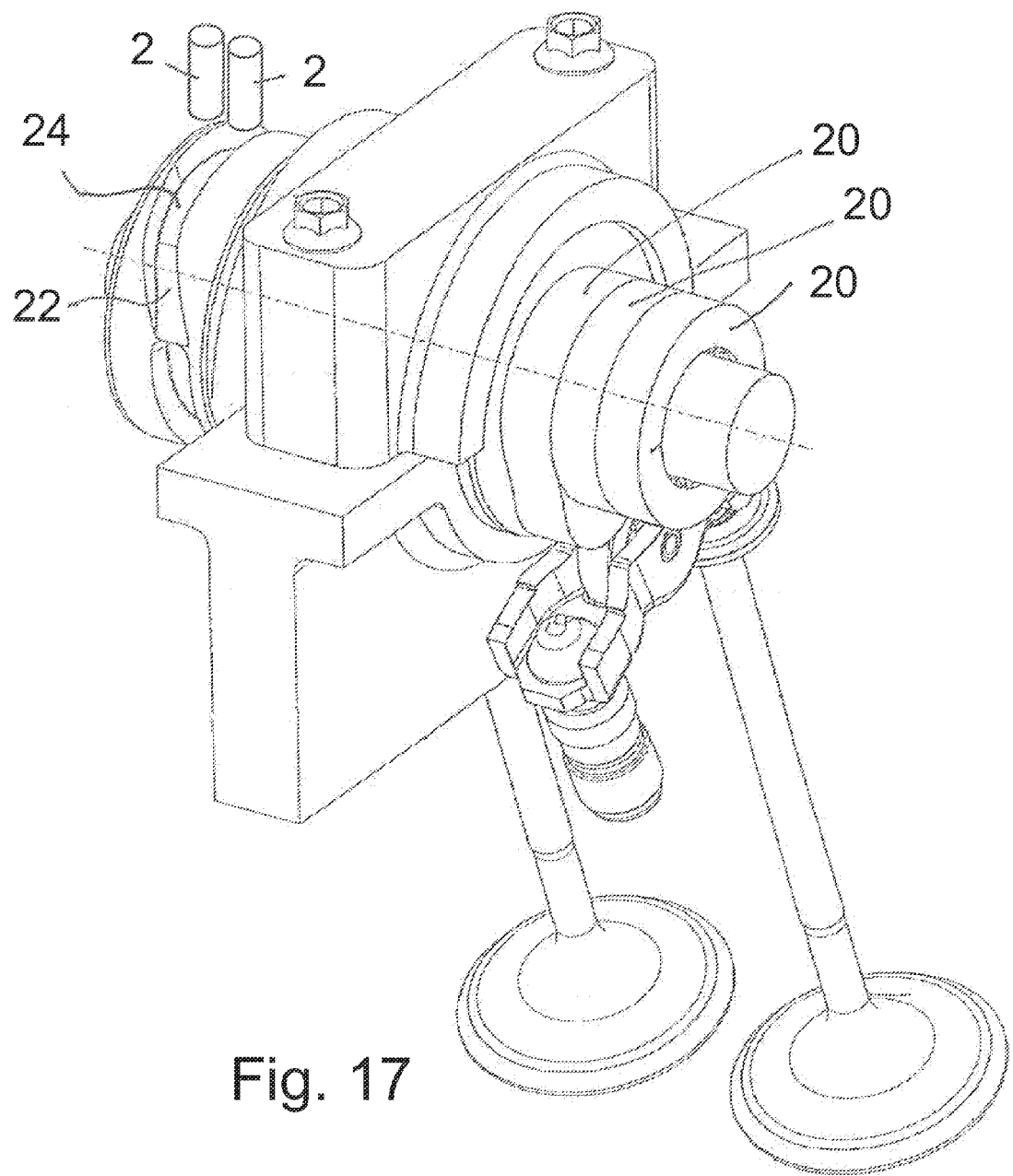
FIG. 17 shows sliding cams for interacting with the engaging pins of the actuator devices shown in FIGS. 1 to 16.

To the extent shown in detail in FIG. 1 through 16, 1 denotes a housing in which engaging pins 2 are axially movably supported. FIG. 17 shows sliding cams 20 for interacting with the engaging pins of the actuator devices shown in FIGS. 1 to 16. Engaging pins 2 are loaded by compression springs 2 toward the exit from the housing. In addition, at the end region thereof facing the housing, engaging pins 2 feature detent grooves 4 which are adjoined by cylindrical sections at whose ends, end chamfers 5 are integrally formed. Provided in the interior of housing 1 is a shift gate 6 which embraces the ends of the engaging pins, has a pot-like form and an end-side edge that is compressively loaded by a spring 7, spring 7 being at least indirectly braced against housing 1 and preloading shift gate 6 in the direction of engaging pins 2. Shift gate 6 has a central opening 8 into which a pin-like projection 9 extends.

In the exemplary embodiment in accordance with FIG. 1 through 8, shift gate 6 is connected in a torsionally fixed manner via central opening 8 to pin-like projection 9, for example, in that the central opening and the pin-like projection feature a square profile. Pin-like projection 9, in turn, is part of a rotary motor 10 that is mounted in a torsionally fixed manner in housing 1. Rotary motor 10 is supported on a retaining washer 11 and offers resistance to the force of spring 7. In addition, bores are incorporated in shift gate 6 that taper toward engaging pins 2 and form an inner limit stop for balls 12 formed as detent elements. Outside of the shift gate, balls 12 are preloaded by a spring steel sheet 13 in the direction of detent grooves 4.

Figure 1:
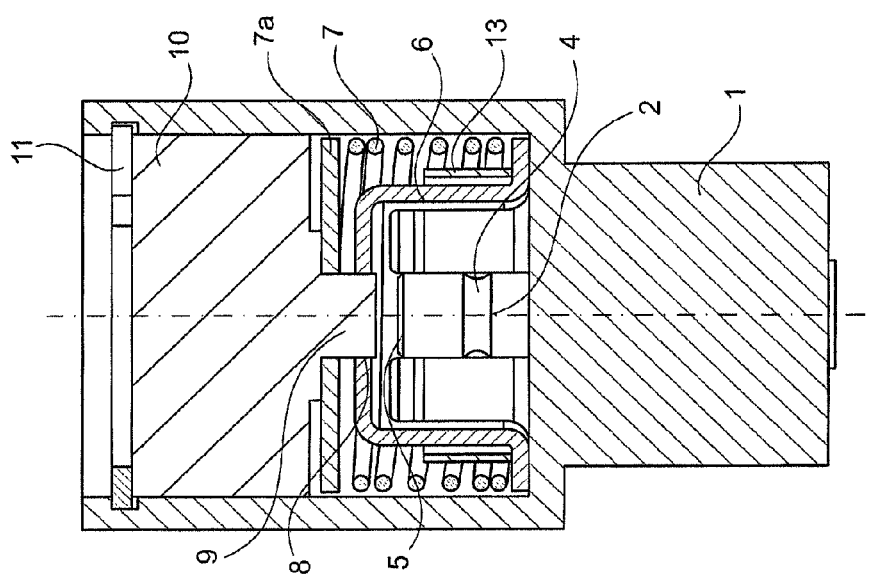
FIGS. 1 and 2 show cross sections through an actuator device having one and two engaging pins in an arresting position in accordance with the one exemplary embodiment of the present invention.
Figure 2:
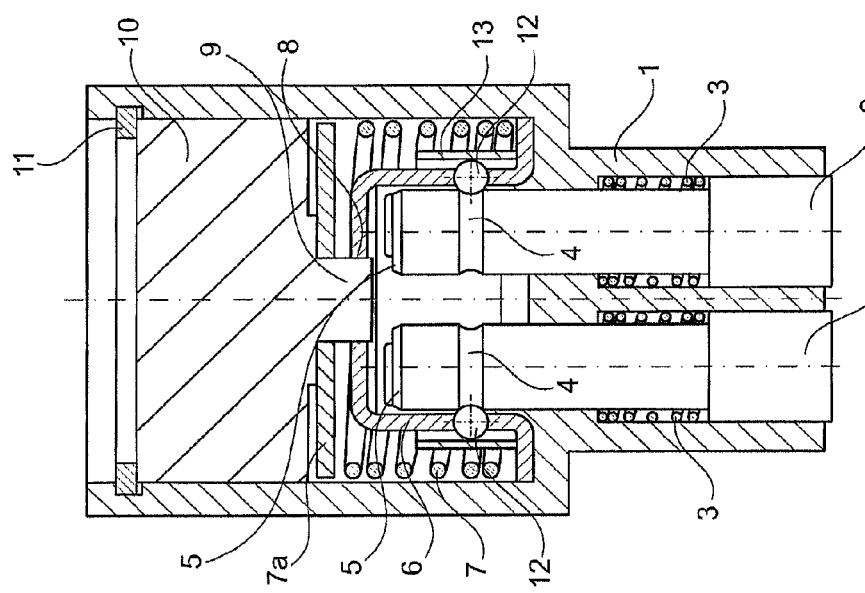

As may be inferred from FIGS. 1 and 2, balls 12, loaded by the radial force of spring steel sheet 13, engage in detent grooves 4 of engaging pins 2 and hold them in the arresting position counter to the force of compression springs 3. If engaging pins 2 are to be disengaged, then rotary motor 10 is activated, and, via pin-like projection 9 and central opening 8, swivels shift gate 6 to the point where balls 12 leave the detent grooves and release engaging pins 2. Both in the exemplary embodiment in accordance with FIGS. 1-8, as well as in the exemplary embodiment in accordance with FIG. 9-16, balls 12 are located at a radius on shift gate 6 that is considerably larger than the diameter of engaging pins 2. However, the position of engaging pins 2 in housing 1 is selected to allow balls 12 to reach detent grooves 4.

FIGS. 3 and 4 show the position of shift gate 6 in which balls 12 have left detent grooves 4 and engaging pins 2 are extended out. Shift gate 6 is subsequently swiveled again into a position that allows balls 12 to reach detent grooves 4 of engaging pins 2. Rotary motor 10 may either be limited in rotary motion by an internal limit stop, the shaft thereof being subsequently reset by an internal torsion spring, or it may continue to rotate incrementally until balls 12 release detent grooves 4, and subsequently continue to rotate by a corresponding angle of rotation until balls 12 again reach detent grooves 4.

Subsequently thereto, the lead-out slopes 22 (FIG. 17) of the sliding cam system begin in accordance with FIGS. 5 and 6 to push back the engaging pins, end chamfers 5 moving balls 12 outwardly against the force of spring steel sheet 13, whereupon they engage into detent grooves 4 after moving further, whereby the initial state is reached in accordance with FIGS. 1 and 2. FIGS. 7 and 8 show an intermediate position where balls 12 have already been pressed outwardly by the end chamfers, however, have not yet reached detent grooves 4.

Figure 12:
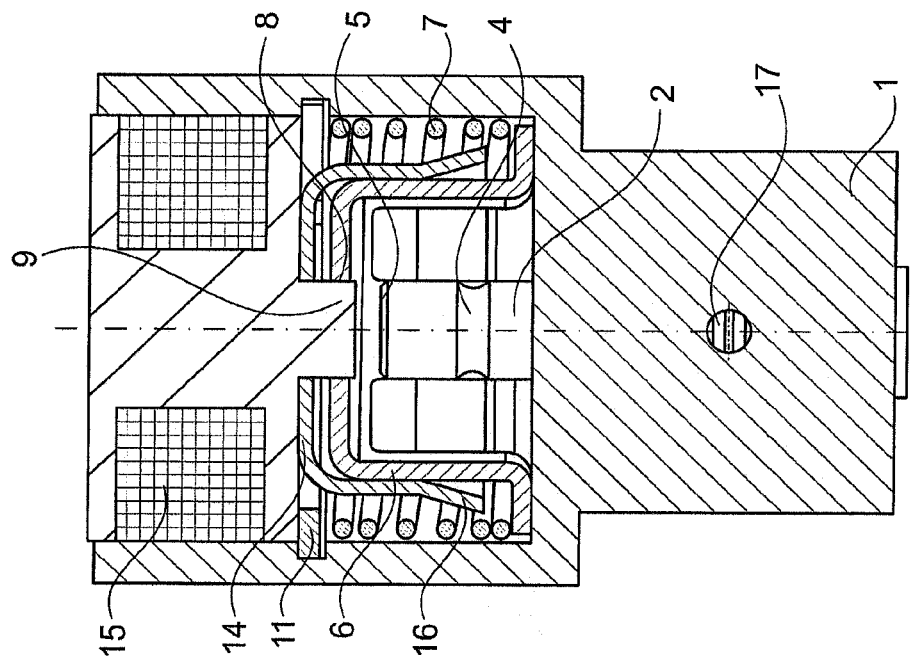
FIGS. 11 and 12 show cross sections through the actuator device in accordance with FIGS. 9 and 10, where the balls configured as detent elements are freed for release.
Figure 11:
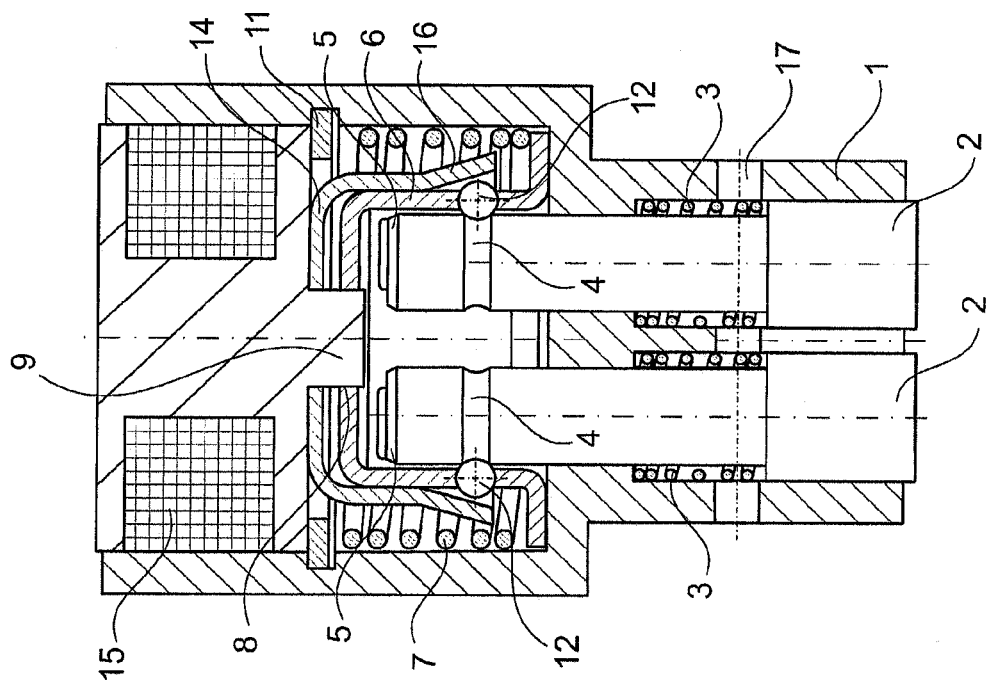

FIG. 9 through 16 differ from FIG. 1 through 8 in that shift gate 6 is surrounded by an actuator pot 14 that is likewise mounted on pin-like projection 9. In the exemplary embodiment in accordance with FIG. 9 through 16, an electromagnetic unit 15 adjoining pin-like projection 9 is installed in housing 1 and is able to attract or repel, respectively release actuator pot 14 which is made of ferromagnetic material. In this exemplary embodiment, shift gate 6 is nonmagnetic and is preferably manufactured from a nonferrous material, in particular plastic. At an end facing away from electromagnetic unit 15, actuator pot 14 has a conically formed peripheral region 16, so that, given the position of attraction by electromagnetic unit 15, actuator pot 15 releases balls 12 and, in the opposite position thereof, arrests balls 12 via peripheral region 16 in a position where they engage in detent grooves 4. In FIGS. 11 and 12, actuator pot 14 is attracted by electromagnetic unit 15, and balls 12 are released. FIGS. 13 and 14 show the position of engaging pins 2 that is predetermined by compression spring 3, engaging pins 2 being located in the grooves 24 (FIG. 17) of the sliding cam system.

In FIGS. 15 and 16, engaging pins 2 are already somewhat lifted by the lead-out slope, so that balls 12 contact end chamfers 5 of the engaging pins. Balls 12 do, in fact, abut outwardly on peripheral region 16 of actuator pot 14. However, shift gate 6 is already somewhat raised, so that, in response to further raising of actuator pot 14, balls 12 are released, or, in conjunction with the further inward movement of engaging pins 2 and the tensioning force of spring 7, they lift actuator pot 14 via peripheral region 16, thereby reaching the initial position in accordance with FIGS. 9 and 10.

In FIG. 9 through 16, a vent bore 17 is provided in housing 1 that reaches to the spaces of compression springs 3, thereby allowing them to communicate with the ambient environment.

LIST OF REFERENCE NUMERALS 1 housing
2 engaging pins
3 compression spring
4 detent grooves
5 end chamfers
6 shift gate
7 spring
7a spring plate
8 central opening 9 pin-like projection
10 rotary motor
11 retaining washer
12 balls
13 spring steel sheet
14 actuator pot
15 electromagnetic unit
16 peripheral region
17 vent bore

What is claimed is:

1. An actuator device of a sliding cam system having at least one sliding cam comprising:
 a housing fastenable to a component of a cylinder head or to the cylinder head of an internal combustion engine;
 at least one engaging pin projecting out from the housing, the engaging pin configured for contacting at least one groove of the sliding cam system that has at least one lead-out slope, the engaging pin being spring-loaded toward the sliding cam, wherein, in a refracted position thereof facing the at least one groove, the engaging pin being securable in place by a lockable latch device, the lockable latch device including at least one detent element and a section for engaging the at least one detent element in a first configuration in which the lockable latch device prevents the engaging pin moving longitudinally and disengaging the at least one detent element in an second configuration in which the lockable latch device allows the engaging pin to move longitudinally, the section forcing the at least one detent element into an outer surface of engaging pin in the first configuration.

2. The actuator device as recited in claim 1 wherein the at least one detent element is operatively connected to at least one detent groove on the outer surface of the engaging pin.

3. The actuator device as recited in claim 2 wherein the detent element is movably guided in a shift gate radially to the engaging pin and is fixed transversely thereto.

4. The actuator device as recited in claim 3 wherein the detent element includes a ball.

5. The actuator device as recited in claim 2 wherein the detent groove is adapted to receive a head or a ball of the detent element, the detent groove being shaped such that a transverse movement between the detent groove and the head or the ball releases the head or the ball from the groove.

6. The actuator device as recited in claim 2 wherein guidance of the detent element is implemented as a bore in a shift gate tapering toward the detent groove to a dimension smaller than the dimension of the detent element.

7. The actuator device as recited in claim 6 wherein the detent element includes a ball.

8. The actuator device as recited in claim 2 wherein the detent element is preloaded in the direction of the detent groove by the section, the section being a spring steel sheet.

9. The actuator device as recited in claim 8 wherein the detent element includes a ball.

10. The actuator device as recited in claim 1 wherein the lockable latch device includes a shift gate in which the detent element is movably guided, the shift gate having a yoke- or pot-shaped design and being loaded in the direction of the engaging pin by a spring braced against the housing directly or via interposition of a component, and leads through a central opening to a pin-shaped projection.

11. The actuator device as recited in claim 10 further comprising an actuator for rotating the shift gate between a first position in which the section is engaged with the at least one detent element and the lockable latch device is in the first configuration and a second position in which the section is disengaged from the at least one detent element and the lockable latch device is in the second configuration.

12. The actuator device as recited in claim 11 wherein the central opening is connected to the pin-shaped projection in a torsionally fixed, but displaceable manner, the actuator being a rotary motor supported on the housing at least nonrotatably relative thereto, the pin-shaped projection being part of the rotary motor.

13. The actuator device as recited in claim 10 further comprising an actuator for moving a magnetic actuator pot between a first position in which the magnetic actuator pot is engaged with the at least one detent element and the lockable latch device is in the first configuration and a second position in which the magnetic actuator pot is disengaged from the at least one detent element and the lockable latch device is in the second configuration.

14. The actuator device as recited in claim 13 wherein the actuator is an electromagnetic unit installed in the housing so as to at least axially fixed thereto and to adjoin the pin-shaped projection.

15. The actuator device as recited in claim 1 wherein the lockable latch device includes a shift gate in which the detent element is movable and is surrounded by the section, the section being a magnetic actuator pot, the shift gate being axially movably supported on a pin-shaped projection, and having a peripheral region having a conical inner surface against which at least the detent element is braced.

* * * * *